United States Patent [19]

Zubli

[11] Patent Number: 4,811,466
[45] Date of Patent: * Mar. 14, 1989

[54] RELEASABLE PULL CORD ENGAGEMENT DEVICE

[76] Inventor: Albert F. Zubli, 88 Cedar Drive, Great Neck, N.Y. 11021

[*] Notice: The portion of the term of this patent subsequent to Sep. 14, 2004 has been disclaimed.

[21] Appl. No.: 28,967

[22] Filed: Mar. 23, 1987

[51] Int. Cl.⁴ .............................................. F16G 11/00
[52] U.S. Cl. .................................. 24/115.G; 24/136 L
[58] Field of Search ............... 24/115 G, 136 L, 266, 24/543

[56] References Cited

U.S. PATENT DOCUMENTS

| | | | |
|---|---|---|---|
| 75,750 | 3/1868 | Gridley | 24/115 G |
| 1,616,881 | 2/1927 | Wharton | 24/115 G |
| 1,639,278 | 8/1927 | Wharton et al. | 24/115 G |
| 2,443,335 | 6/1948 | Vogel | 24/136 L |
| 2,457,195 | 12/1948 | Bagnall, Jr. | 24/115 G |
| 2,471,623 | 5/1949 | Hubbell | 24/115 G |
| 2,524,649 | 10/1950 | Buhler | 24/115 G |
| 4,328,605 | 5/1982 | Hutchison et al. | 24/115 G |
| 4,453,292 | 6/1984 | Bakker | 24/115 G |
| 4,506,417 | 3/1985 | Hara | 24/115 G |

Primary Examiner—Victor N. Sakran
Attorney, Agent, or Firm—S. C. Yuter

[57] ABSTRACT

A releasable pull cord engagement device for venetian blinds having a mounting post consisting of a cylindrical pedestal extending from a base and a stud extending from the center of the outer end of the pedestal. A slider has end and side walls encompassing a cylindrical hollow portion which slides over the pedestal. Aligned openings pass through opposite portions of the side walls of the slide and through the pedestal. A conical spring abuts the inside the end wall of the slider and engages the stud to urge the slider and pedestal apart so that a pull cord passing through the openings is engaged due to misalignment of the openings. When the slider is pressed over the pedestal the openings are aligned and the pull cord may readily be pulled through them.

16 Claims, 2 Drawing Sheets

U.S. Patent  Mar. 14, 1989  Sheet 1 of 2  4,811,466
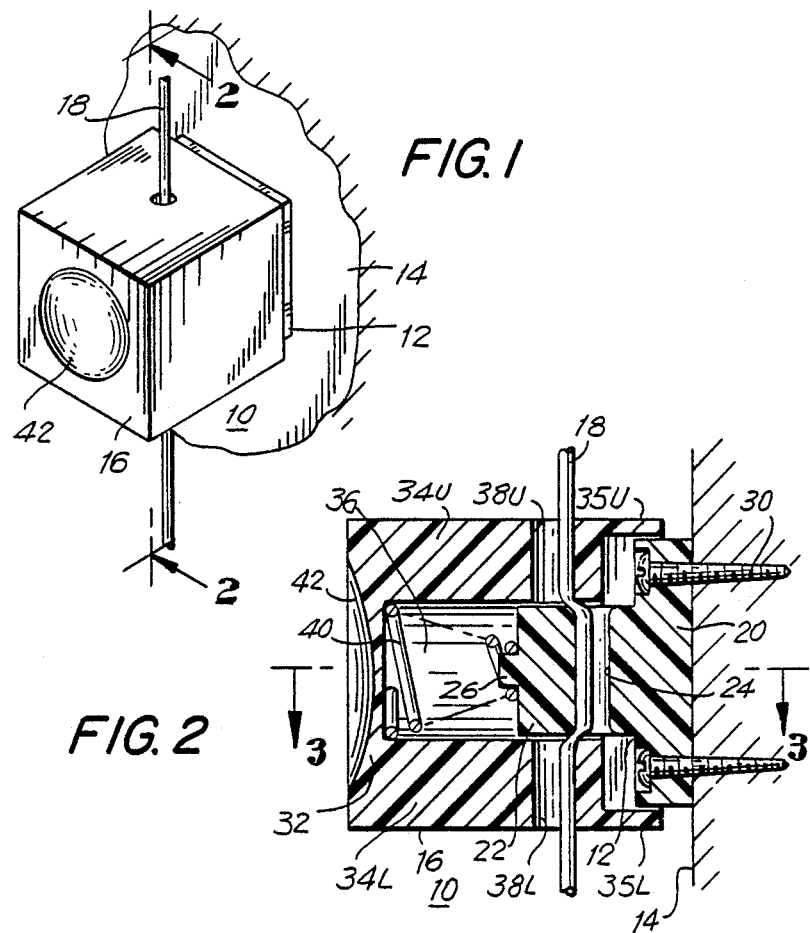
FIG. 1
FIG. 2
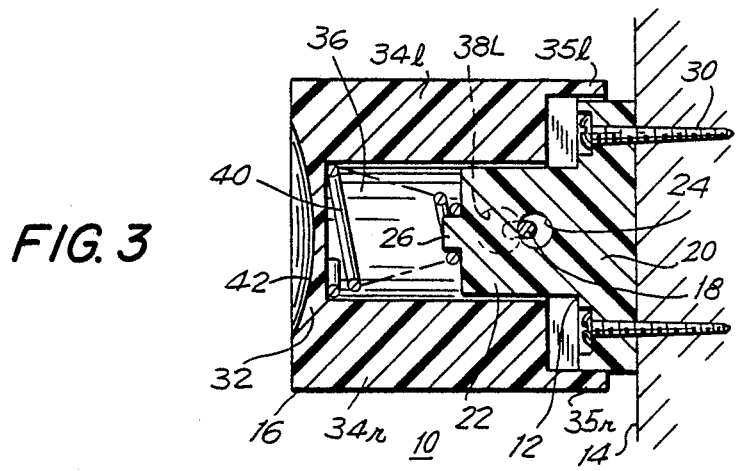
FIG. 3

RELEASABLE PULL CORD ENGAGEMENT DEVICE

BACKGROUND OF THE INVENTION

This invention pertains to devices for releasably engaging cords and, more particularly, to a device for engaging the pull cord of a venetian blind, roller shade or other window or door covering to set the covering in a fixed position, and then for releasing the cord in order to set the covering into a new position.

DESCRIPTION OF THE RELATED ART

In venetian blinds and other window coverings a pull cord is provided in an engagement mechanism, usually at the top right of the covering, to set the covering into a desired position, for example at its maximum open position. When it is desired to partially or fully cover the window the pull cord is released, usually by pulling it angularly sideways, so that the window covering can be lowered to the desired position, and then the pull cord is returned to vertical alignment so that the engagement mechanism engages the pull cord with the covering at that position. Thereafter, to raise or lower the covering, the pull cord is again released, the covering moved to a new position, and then the pull cord is reengaged.

A recurring problem with many of the pull cord engagement devices in the prior art is that, sometimes, the pull cord is hard to release because it is difficult to disengage the engagement mechanism.

BRIEF SUMMARY OF THE INVENTION

The principal object of the invention is to provide an improved device for releasably engaging the pull cords of venetian blinds and other window and door coverings.

Another object of the invention is to provide a releasable pull cord engagement device which is simple and easy to use.

Still another object of the invention is to provide a relatively inexpensive releasable pull cord engagement device which is strong and durable.

Briefly, in accordance with the invention, a releasable pull cord engagement device is provided comprising a mounting post adapted to be attached to a surface and having an extending pedestal with a transverse opening. A slider has end and side walls encompassing a hollow portion which is adapted to encompass and slide over the pedestal. The slider has aligned openings in opposite portions of the side wall which are alignable with the transverse opening in the pedestal. The openings have diameters large enough to permit a pull cord to readily pass through. A spring abuts the inside end of the slider and the end of the pedestal and urges the slider and pedestal apart. When the slider is pressed against the pedestal and openings are aligned and the pull cord may be pulled through the openings. When the slider is released the spring urges the openings out of alignment thus engaging the pull cord at the junctions of the slider openings and the pedestal opening.

A feature of the invention is a conical depression in the outer end of the slider adapted to receive the end of a finger for pressing the slider against the mounting post to release an engaged pull cord.

Other objects and features as well as advantages of the invention will be apparent from the following Detailed Description of the Invention taken together with the accompanying drawing in which:

FIG. 1 is a perspective view of a releasable pull cord engagement device in accordance with the preferred embodiment of the invention as mounted on a surface.

FIG. 2 is a side cross-sectional view taken along the lines 2—2 of FIG. 1 showing a pull cord passing through the device with the pull cord engaged.

FIG. 3 is a top cross-sectional view taken along the lines 3—3 of FIG. 2 showing the pull cord engaged.

DETAILED DESCRIPTION OF THE INVENTION

Figure 4:
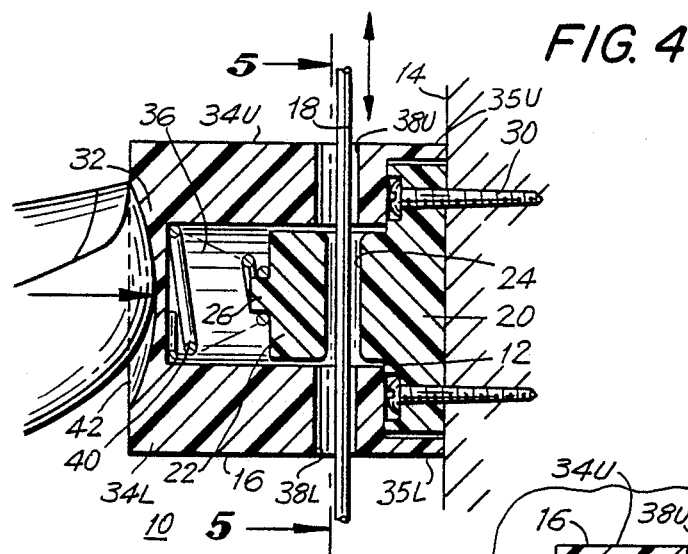
FIG. 4 is a side cross-sectional view similar to that of FIG. 2 but showing the pull cord readily passing through the device when a finger is pressed against its conical depression.

Referring to FIGS. 1–3 and 6, the releasable pull cord engagement device 10 generally comprises a mounting post 12 adapted to be mounted on a surface 14 and a slider 16 which slides over the mounting post 12. A pull cord 18 passes through openings in the slider 16 and mounting post 12 when the openings are in alignment. The pull cord 18 is engaged in the device 10 when the openings are out of alignment.

Mounting post 12 consists of a base 20 (FIGS. 2, 3 and 6), which has a square cross section, and a cylindrical pedestal 22 extending from the center portion of the base 20. A transverse opening 24 passes completely through the pedestal 22. Extending from the center of the outer end of pedestal 22 is a stud 26. Base 20 has four equally-spaced and recessed holes 28 adapted to receive four screws 30 used to mount the mounting post 12 against a surface 14 adjacent the window or door to be covered by a venetian blind, roller shade or other window or door covering.

Slider 16 (FIGS. 2 and 3), also square in cross section, has an end wall 32 and four sidewalls 34 which encompass a cylindrical hollow portion 36. Side walls 34 consist of upper sidewall 34U (FIG. 2), lower sidewall 34L, left sidewall 34l (FIG. 3) and right sidewall 34r. Extending from side walls 34 and slidable along the sides of base 20 are corresponding extension walls 35U, 35L, 35l and 35r. The linear distance between the outer ends of side walls 35 and the outer surface of base 20 is equal to the linear distance between the outer ends of extension walls 35 and the bottom surface of base 20.

Cylindrical hollow portion 36 has an inside diameter slightly larger than the outside diameter of pedestal 22 so that slider 16 may readily slide over and encompass pedestal 22. An upper opening 38U (FIG. 2) passes through the upper sidewall 34U and a lower opening 38L passes through the lower sidewall 34L. Openings 38U and 38L are on a common axis and thus is alignment with each other and on a parallel axis with transverse opening 24 in pedestal 22.

Positioned in the cylindrical hollow portion 36 of slider 16 between the inside of end wall 32 and the outer end of pedestal 22 is a conical spring 40. The larger diameter end of conical spring 40 abuts the inside of end wall 32 and the smaller diameter end of conical spring 40 encircles stud 26. The length of conical spring 40 is such that it urges slider 16 and mounting post 12 apart.

With conical spring 40 in a rest position, transverse opening 24 of pedestal 12 is out of alignment with openings 38U and 38L.

Figure 5:
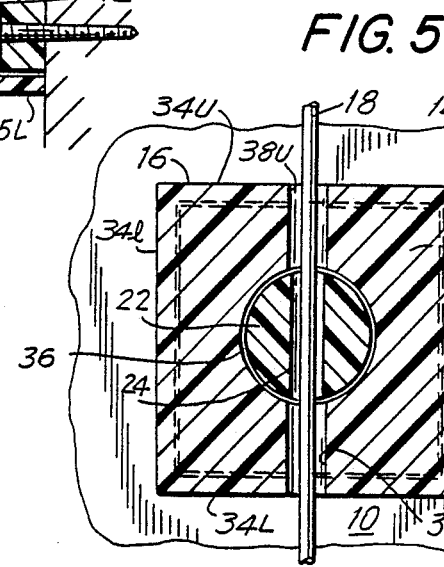
FIG. 5 is an end cross-sectional view taken along the lines 5—5 of FIG. 4 showing the pull cord readily passing through the device.
Figure 6:
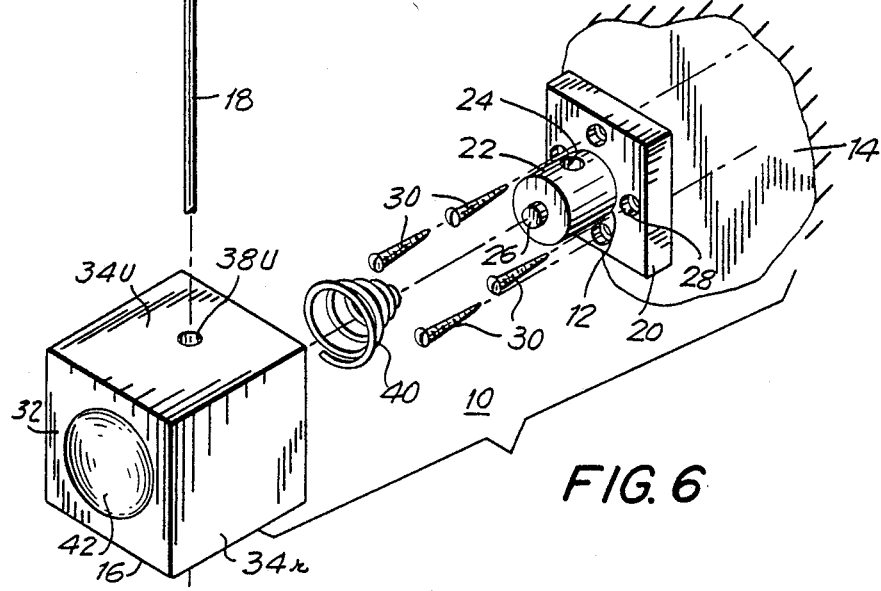
FIG. 6 is an exploded perspective view of the device showing the relationship of its parts.

At the outer end of slider 16 is a conical depression 42 (FIGS. 1-3). Conical depression 42 is sized to receive the end of a finger so that slider 16 can be pushed over mounting post 12 against the force of conical spring 40, as shown in FIG. 4. When slider 16 is pushed over pedestal 22 and against mounting post 12, with the outer ends of side walls 34 abutting the outer surface of base 20, transverse opening 24 lines up with openings 38U and 38L so that pull cord 18 will readily pass through the aligned openings 24, 38U and 38L. When these openings are thus aligned (FIGS. 4 and 5) pull cord 18 may be pulled downward to raise an associated venetian blind, or controllably released to lower the associated venetian blind.

When the finger is removed from slider 16, conical spring 40 urges slider 16 and mounting post 12 apart causing transverse opening 24 to shift out of alignment with openings 38U and 38L. As shown in FIGS. 3 and 4, when these three openings are out of alignment pull cord 18 is bent at the junction of upper opening 38U with the upper end of transverse opening 24 and also at the junction of lower opening 38L with the lower end of transverse opening 24, thus engaging pull cord 18 in the releasable pull cord engagement device 10.

When pull cord 18 is thus engaged the associated venetian blind is held in a fixed position over a window covered by the venetian blind. That fixed position is determined by the amount of pull cord 18 which is pulled through or released through the device 10 before the finger is removed from slider 16. Roller shades can be fixed in a desired position covering a window in exactly the same way.

Slider 16 and mounting post 12 can be molded from the thermal plastics such as acryliconitrite butadiene styrene (ABS), polypropylene, nylon or polycarbonates. A high impact styrene is preferred.

Thus, in accordance with the invention, an improved releasable pull cord engagement device has been provided which is much easier and simpler to use than the prior angular-pull devices, is relatively inexpensive to manufacture and is strong and durable.

What is claimed is:

1. A releasable pull cord engagement device for venetian blinds or a similar window or door covering comprising:
   (A) mounting post means adapted to be attached to a surface near the covering;
   (B) said mounting post means comprising a cylindrical pedestal having a given outer diameter;
   (C) a transverse hole passing through said cylindrical pedestal having an inner diameter larger than the outer diameter of a pull cord and adapted to have a pull cord readily pass through it;
   (D) a stud having a given outer diameter extending from the center of the outer end of said cylindrical pedestal;
   (E) slider means having end and side walls encompassing a cylindrical hollow portion with an inner diameter slightly larger than the given outer diameter of said cylindrical pedestal and adapted to encompass and slide over said cylindrical pedestal;
   (F) a conical spring having a maximum outer diameter slightly less than the inner diameter of said cylindrical hollow portion and a minimum diameter slightly larger than the outer diameter of said stud, said conical spring having its maximum diameter end abutting the inside of the end wall of said slider means and its minimum diameter end encircling said stud;
   (G) an upper hole passing through a portion of said side wall of said slider means and an aligned lower hole passing through an opposite portion of said side wall of said slider means, said upper and lower holes each having an inner diameter which is larger than the outer diameter of the pull cord and, when said upper and lower holes are aligned with the transverse hole of said cylindrical pedestal, a pull cord may be readily passed through said aligned holes;
   (H) whereby, when said slider means is pushed against the spring pressure of said conical spring and against said mounting post means, said upper, lower and transverse holes are in alignment and a pull cord will readily pass through said aligned holes, and when said slider means is released, said conical spring will urge said upper and lower holes out of alignment with said transverse hole to engage said pull cord at the junctions of said upper and lower holes with said transverse hole by bending said pull cord at said junctions.

2. A releasable pull cord engagement device according to claim 1 wherein said mounting post means comprises a base extending transversely beyond the outer surface of said cylindrical pedestal and having a plurality of recessed screw mounting holes adapted to receive screws for mounting said mounting post means on a surface.

3. A releasable pull cord engagement device according to claim 2 wherein said side wall of said slider means has an extension wall which longitudinally extends from said side wall and encompasses and slides over said base of said mounting post means.

4. A releasable pull cord engagement device according to claim 3 wherein said slider means has a conical depression on the outside of its end wall adapted to receive the end of a finger employed to push said slider means against said mounted post means to release a pull cord engaged in the upper, lower and transverse holes.

5. A releasable pull cord engagement device according to claim 4 wherein said slider means has a square cross section and said base of said mounting post means has a square cross section.

6. A releasable pull cord engagement device according to claim 5 wherein said slider means and said mounting post means are made from a thermal plastic.

7. A releasable pull cord engagement device for venetian blinds or a similar window or door covering comprising:
   (A) mounting post means adapted to be attached to a surface near the covering;
   (B) said mounting post means comprising a cylindrical pedestal having a given outer diameter;
   (C) a transverse hole passing through said cylindrical pedestal having an inner diameter larger than the outer diameter of a pull cord and adapted to have a pull cord readily pass through it;
   (D) slider means having end and side walls encompassing a cylindrical hollow portion with an inner diameter slightly larger than the given outer diameter of said cylindrical pedestal and adapted to encompass and slide over said cylindrical pedestal;

(E) spring means abutting the inside of the end wall of said slider means and the end of said cylindrical pedestal;

(F) an upper hole passing through a portion of said side wall of said slider means and an aligned lower hole passing through an opposite portion of said side wall of said slider means, said upper and lower holes each having an inner diameter which is larger than the outer diameter of the pull cord and, when said upper and lower holes are aligned with the transverse hole of said cylindrical pedestal, a pull cord may readily pass through said aligned holes;

(G) whereby, when said slider means is pushed against the spring pressure of said spring means and against said mounting post means, said upper, lower and transverse holes are in alignment and a pull cord will readily pass through said aligned holes, and when said slider means is released, said spring means will urge said upper and lower holes out of alignment with said transverse hole to engage said pull cord at the junctions of said upper and lower holes with said transverse hole by bending said pull cord at said junctions.

8. A releasable pull cord engagement device according to claim 7 wherein said slider means has a conical depression on the outside of its end wall adapted to receive the end of a finger employed to push said slider means against said mounted post means to release a pull cord engaged in the upper, lower and transverse holes.

9. A releasable pull cord engagement device according to claim 7 wherein said mounting post means comprises a base extending transversely beyond the outer surface of said pedestal and having a plurality of screw mounting holes adapted to receive screws for mounting said mounting post means on a surface.

10. A releasable pull cord engagement device according to claim 9 wherein said side wall of said slider means has an extension wall which longitudinally extends from said side wall and encompasses and slides over said base of said mounting post means.

11. A releasable pull cord engagement device according to claim 10 wherein said slider means has a conical depression on the outside of its end wall adapted to receive the end of a finger employed to push said slider means against said mounted post means to release a pull cord engaged in the upper, lower and transverse holes.

12. A releasable pull cord engagement device for a window covering comprising:

(A) mounting post means adapted to be attached to a surface;

(B) said mounting post means comprising a pedestal;

(C) a transverse hole passing through said pedestal having an inner diameter larger than the outer diameter of a pull cord and adapted to have a pull cord readily pass through it;

(D) slider means having end and side walls encompassing a hollow portion adapted to encompass and slide over said pedestal;

(E) spring means adapted to abut the inside of the end wall of said slider means and the end of said pedestal;

(F) an upper hole passing through a portion of said side wall of said slider means and an aligned lower hole passing through an opposite portion of said side wall of said slider means, said upper and lower holes each having an inner diameter which is larger than the outer diameter of the pull cord and, when said upper and lower holes are aligned with the transverse hole of said pedestal, a pull cord may readily pass through said aligned holes;

(G) whereby, when said slider means is pushed against the spring pressure of said spring means and against said mounting post means, said upper, lower and transverse holes are in alignment and a pull cord will readily pass through said aligned holes, and when said slider means is released, said spring means will urge said upper and lower holes out of alignment with said transverse hole to engage said pull cord at the junctions of said upper and lower holes with said tranverse hole by bending said pull cord at said junctions.

13. A releasable pull cord engagement device according to claim 12 wherein said mounting post means comprises a base transversely extending beyond the outer surface of said pedestal and having a plurality of screw mounting holes adapted to receive screws for mounting said mounting post means on a surface.

14. A releasable pull cord engagement device according to claim 13 wherein said side wall of said slider means has an extension wall which longitudinally extends from said side wall and encompasses and slides over said base of said mounting post means.

15. A releasable pull cord engagement device according to claim 14 wherein said slider means has a conical depression on the outside of its end wall adapted to receive the end of a finger employed to push said slider means against said mounted post means to release a pull cord engaged in the upper, lower and transverse holes.

16. A releasable pull cord engagement device according to claim 15 wherein said slider means and said mounting post means are made from a thermal plastic.

* * * * *